United States Patent [19]
Nakauchi et al.

[11] 3,898,691
[45] Aug. 5, 1975

[54] INCREMENTAL TAPE DRIVE WITH CLAMP AND DEFLECTOR

[75] Inventors: Shunsaku Nakauchi, Tokyo; Yasuo Ueno, Urawa, both of Japan

[73] Assignee: Kokusai Gijutsu Kaihatsu Kabushiki Kaisha, Tokyo, Japan

[22] Filed: Oct. 12, 1973

[21] Appl. No.: 405,866

[30] Foreign Application Priority Data

Oct. 17, 1972 Japan .............................. 47-103190
Sept. 14, 1973 Japan .............................. 48-103299

[52] U.S. Cl. .............................................. 360/52
[51] Int. Cl. .............................................. G11b 5/09
[58] Field of Search .......... 360/52, 53, 90; D26/145

[56] References Cited

UNITED STATES PATENTS

| | | | |
|---|---|---|---|
| 3,145,373 | 8/1964 | Willard | 360/52 |
| 3,319,237 | 5/1967 | Jones, Jr. | 360/52 |
| 3,482,229 | 12/1969 | Burr | 360/52 |
| 3,487,392 | 12/1969 | Lewis | 360/52 |
| 3,786,456 | 1/1974 | Crafts | 360/52 |

*Primary Examiner*—Vincent P. Canney
*Attorney, Agent, or Firm*—Charles W. Helzer

[57] ABSTRACT

In an incremental digital magnetic tape recorder in which a magnetic tape is advanced intermittently for recording intermittent input signals, there are provided braking means for applying a braking force upon the magnetic tape, means for applying a torque upon a tape take up reel for taking up the tape under a predetermined tension smaller than the braking force, and a deflector for deflecting a portion of the magnetic tape extending between the magnetic head and the take up reel in a direction lateral to the direction of normal movement of the tape.

For the purpose of providing the "read-after-write" feature, deflectors are provided on the opposite sides of the magnetic portion of the tape with a so that a portion of the head just completed recording of a signal can be immediately moved back to reproduce and check the recorded signal.

13 Claims, 18 Drawing Figures

INCREMENTAL TAPE DRIVE WITH CLAMP AND DEFLECTOR

BACKGROUND OF THE INVENTION

This invention relates to an incremental digital magnetic tape recorder of the class wherein each time an input data to be recorded is received, a length of the magnetic tape required to record the input data is moved, whereas in the absence of the input data the magnetic tape is maintained stationary.

The invention also relates to an incremental digital magnetic tape recorder wherein the recording is made intermittently and after each recording the content of the record is moved back and reproduced to check the same.

It has already been proposed to provide a magnetic tape recording apparatus wherein each time discontinuously and randomly occuring data is received, the magnetic tape is started to record the data but the tape is held stationary in the absence of such data. However, with the known apparatus considerable time is required to start and stop the tape so that it has been extremely difficult to advance the tape one pitch per one bite (eight bits) as in a paper tape perforator, or there was a defect that an excessively large length of the tape is fed per one pitch.

Considering a cassette tape recording apparatus adapted to record typewriter printing inputs each consisting of 8 bits, as an example, the length of the tape required to serially record 8 bits amounts to about 0.25 mm, at a recording density of 800BPI.

On the other hand in the conventional cassette tape recording apparatus of the class wherein the magnetic tape is started and stopped by an ON, OFF control of pinch rollers, as it takes about 10 to 20 miliseconds until the tape is accelerated to a predetermined definite speed after it has started, so that when the running speed of the tape is selected to be about 10 cm/sec., about 0.5 to 1.0 mm of the tape is fed until the tape attains the definite speed at which recording is possible. In other words, a length of the tape of about 1.0 mm is wasted for recording the data on the length of 0.25 mm. Further, since about 10 miliseconds are required to stop the tape, a length of the tape of from 0.5 to 1.0 mm is also wasted for stopping the tape. For this reason, it has been the practice to store a plurality of signals in a memory device and when the stored signals reach a predetermined quantity, a group of such stored signals is recorded as a block. However, such a system requires the use of a complicated control circuit.

Further, in the so-called incremental magnetic tape recording device of the class wherein the tape is started and stopped for each bit or bite of input signals it has been impossible to reproduce the data immediately after it has been recorded for the purpose of checking the content of the record. In other words, such a recording apparatus lacks the feature of "read-after-write".

SUMMARY OF THE INVENTION

Accordingly, it is an object of this invention to provide a novel incremental digital magnetic tape recording apparatus capable of recording randomly occuring inputs without excessively wasting the magnetic tape.

A further object of this invention is to provide an improved incremental digital magnetic tape recording apparatus capable of quickly starting and stopping the magnetic tape with a simple mechanism.

Still further object of this invention is to provide an incremental digital magnetic tape recording apparatus having a "read-after-write" feature.

According to this invention, these and other objects can be accomplished by providing a magnetic tape recording apparatus of the class wherein a magnetic tape is moved intermittently passed a magnetic head between a pair of tape supply and take up means for intermittently recording signals characterized in that there are provided braking means for applying a braking force upon the magnetic tape, means for applying a torque upon the take up means to take up the magnetic tape under a predetermined tension smaller than the braking force, and deflector means for deflecting the magnetic tape away from the direction of its normal travel between the magnetic head and the take up means.

According to this recording apparatus, input signals are recorded while the magnetic tape is moved passing through the magnetic head and the magnetic tape is held stationary in the absence of the input signal so that it is possible to greatly reduce the waste portion of the tape, that is the portion on which no signal is recorded.

According to a preferred embodiment of this invention tape deflector means are provided on both sides of the magnetic head so that, it is possible to check the content of the record immediately after it has been made by moving back the portion of the magnetic tape containing such record, thus providing the "read-after-write" feature.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
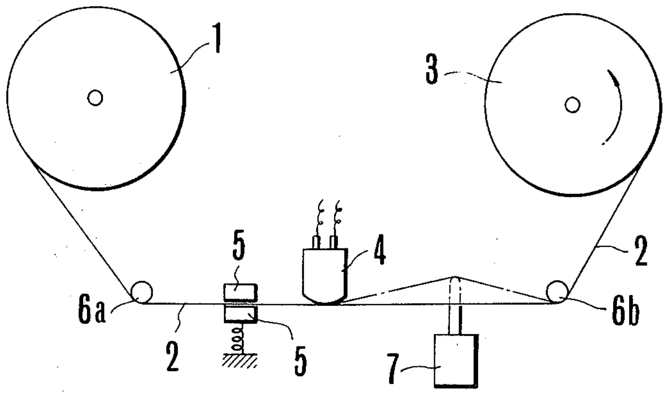
FIG. 1 is a diagrammatic representation of one example of an incremental digital magnetic tape recording apparatus embodying the invention.

A preferred embodiment of this invention illustrated in FIG. 1 comprises a magnetic tape 2 advanced from a supply reel 1 to a take up reel 3 by means of a capstan wheel, not shown, a magnetic head 4, a braking device including a pair of shoes 5 adapted to apply frictional resistance to the magnetic tape 2 passed between the shoes, guide rollers 6*a* and 6*b* and a tape deflector 7 adapted to deflect the tape in a direction substantially perpendicular to the direction of advance thereof.

The recording apparatus shown in FIG. 1 operates as follows: Tape take up reel 3 constantly applies tension to the tape 2 in a direction shown by an arrow to wrap the tape about the take up reel 3 by means of a spring or an electric motor, not shown. Since the tension is adjusted to be smaller than the braking force applied by the braking device the tape is normally maintained in the inoperative condition under tension.

While the deflector 7 is in its inoperative position shown by solid lines the magnetic tape 2 is maintained in the position shown by solid lines under the tension applied by the take up reel 3. When the deflector 7 is rapidly advanced to the operative position shown by dotted lines in response to an external command signal, the tape is also deflected to the position indicated by dotted lines. Under these conditions, the length of the tape between the magnetic head 4 and the guide roller 6b becomes longer than the length of the tape when it is in the position shown by solid lines. This increment of the length is denoted by ΔL.

This increment ΔL may be supplied either from supply reel 1 or take up reel 3 but which one of them supplies the larger portion of ΔL is determined by the inertias of the supply reel 1 and take up reel 3, the braking force applied by braking device 5 and the operating speed of the tape deflector 7.

Where the operating speed of the deflector 7 is very small and the inertia of the take up reel 3 is also small, due to the braking force applied by the braking device 5, most of the increment ΔL of tape 2 will be supplied from the take up reel 3. On the other hand, where the operating speed of deflector 7 is extremely high, and the inertia of take up reel 3 is large whereas that of supply reel 1 is small, nearly all of the increment ΔL will be supplied from the supply reel 1.

Generally speaking, the increment of the tape caused by rapid operation of the deflector 7 is supplemented by both of the supply and take up reels at a ratio determined by the ratio of inertias thereof. The tape supplied from supply reel 1 moves from left to right in front of the magnetic head 4.

As can be clearly noted from the foregoing description, by suitably selecting the inertias of the supply reel 1 and the take up reel 3, the braking force of the braking device 5, and the operating speed of the tape deflector 7, it is possible to move a definite length of the tape from left to right in front of the magnetic head 4 when the deflector advances a definite stroke.

After the magnetic tape has been moved from left to right in front of the magnetic head 4 by the operation of the deflector 7, when the deflector 7 is returned to the original position the tape 2 tends to slack between the magnetic head 4 and the guide roller 6b, since the tape is clamped between the shoes of the braking device 5, such slackened portion will never be permitted to return to the supply reel 1 but instead will be taken up by the take up reel 3.

It is advantageous to position the tape deflector 7 at substantially the middle point between the magnetic head 4 and the guide roller 6*b*. With this arrangement, it is possible to produce a large tension in the tape with a small pushing force provided by the deflector. Moreover, although the movement of the tape through the magnetic head 4 is small, such movement is easily controlled by adjusting a magnified displacement of the tape in the direction of operation of the tape deflector 7.

A deflector 7 having a high response speed is preferred. Generally, a deflector of the moving coil type is preferred. A moving coil mechanism utilized in a dynamic type loud speaker or the like is characterized by its quick response speed and excellent linearity so that this type of the deflector is most suitable to attain the object of this invention.

Figure 2:
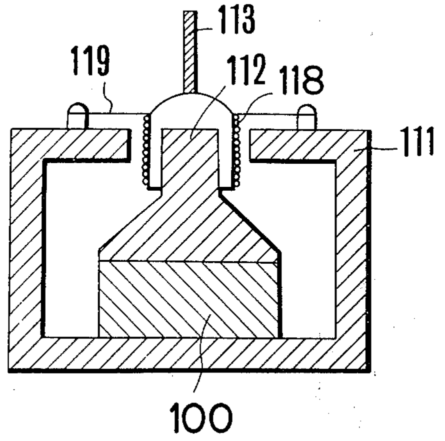
FIG. 2 is a longitudinal sectional view of a tape deflector of the moving coil type.

FIG. 2 shows a longitudinal section of a deflector of the moving coil type which comprises a moving coil 8 supported by a spring 9, a permanent magnet 100 interposed in the central leg 112 of a magnetic core 111, and a push rod 113 secured to the moving coil 8 for deflecting the magnetic tape. With the deflector shown in FIG. 2, it is possible to control the stroke or displacement and speed of the push rod 113 by controlling the current flowing through the moving coil 118. When a detector, not shown, for detecting the position of the push rod is provided and when the signal produced by the detector is fedback to control the current flowing through the moving coil it is possible to accurately control the extent of deflection of the magnetic tape. When a moving coil is used it is possible to advance the tape at an extremely small rate of 0.1 to 1.0 mm in several miliseconds.

Figure 3:
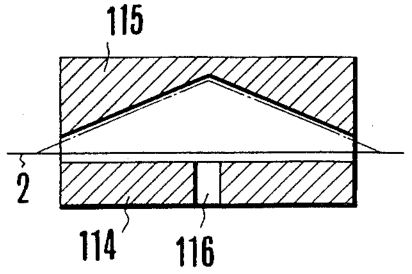
FIG. 3 shows a longitudinal sectional view of a tape deflector actuated by pressurized air.
Figure 4:
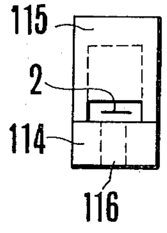
FIG. 4 is an end view of the tape deflector shown in FIG. 3.

In addition to the deflector of the moving coil type, it is also possible to use a deflector of the moving iron type or a deflector using a pneumatic actuator. FIGS. 3 and 4 show a deflector utilizing pressurized air, and comprising upper and lower blocks 115 and 114. The upper block 115 is formed with a triangular cavity through which is passed a magnetic tape 2 whereas the lower block 114 is provided with an air inlet port 116 at the center thereof. When pressurized air is admitted into the triangular cavity the tape will be deflected as shown by dotted lines, the feed speed of the tape in this embodiment being controlled by adjusting the pressure of the pressurized air and the resistance to air of the air inlet port 116.

The driving device used to normally apply tension to the magnetic tape 2 in the take up direction may be an electric motor, for example an induction motor, or a clock mechanism comprising a spring and a ratchet wheel. The spring may be wound manually or by a solenoid intermittently energized.

Figure 5:
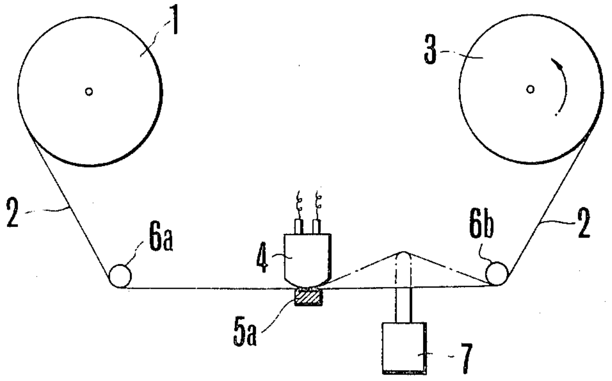
FIG. 5 is a diagrammatic view showing a modified embodiment of this invention.

Although the braking device 5 shown in FIG. 1 comprises a pair of shoes adapted to clamp the magnetic tape therebetween it is also possible to provide a pad 5*a* for urging a magnetic tape against a magnetic head, as shown in FIG. 5.

Instead of applying braking force directly upon the magnetic tape as shown in FIG. 1 it is also possible to apply the braking force to the pay off reel 1.

As above described, in accordance with this invention, by incorporating a tape deflector of simple construction to an ordinary magnetic tape recording apparatus of the continuously recording type it is possible to effectively record randomly applied data by advancing a length of the tape just sufficient to record the data, thereby preventing waste of the magnetic tape.

Figure 6:
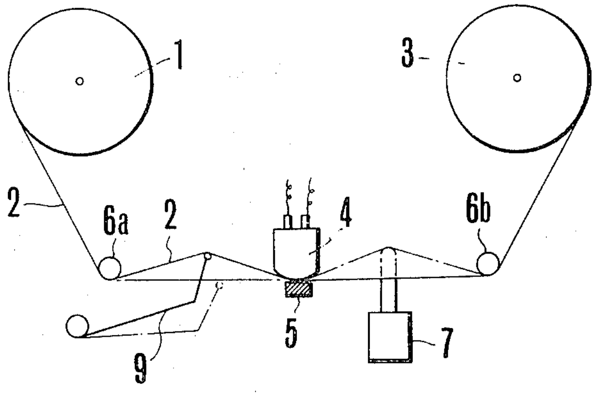
FIG. 6 is a diagram showing a modification of the embodiment shown in FIG. 5.

FIG. 6 shows a modification of the embodiment shown in FIG. 5 wherein a tension arm 9 is provided between the guide roller 6*a* on the side of the supply reel 1 and the magnetic head 4 for the purpose of supplying the increment δL of the tape 2 mainly from the side of the supply reel 1.

The tension arm 9 is pivotally mounted at its left hand end and is biassed toward tape 2 by means of a weak spring not shown to pull the tape 2 out of the supply reel 1 and normally maintain the tape in the solid line position. The tension arm 9 is constructed to have a mass smaller than that of the take up reel 3.

With this construction, due to the frictional resistance between the tape and the magnetic head 4 and the braking device 5, the length of the tape necessary to deflect the tape from the dotted line position to the solid line position shown in FIG. 6 will not be supplied from the side of the take up reel 3 but from the side of the supply reel 1.

While the tape is maintained in the condition shown in FIG. 6, as the deflector 7 is operated quickly, the increment δL is supplied from the side of the tension arm 9 because its mass is smaller than that of the take up reel 3. In this manner, a length of the tape derived out from the supply reel 1 by the action of tension arm 9 is moved from left to right passed the magnetic head 4 by the operation of the deflector 7. Thus, the increment δL of the tape is supplied essentially from the supply reel 1 by the operation of tension arm 9.

After a predetermined length of the tape has been advanced as described above, when the deflector 7 is returned to its original position the tape will slack between the magnetic head 4 and right hand guide roller 6*b*. The slackened tape is not returned to the supply reel but taken up by the take up reel 3 because the tape is clamped between the braking device 5 and the magnetic head 4, and the tension arm 9 derives a new length of the tape out of the supply reel 1, having a length equal to δL.

The modified embodiment shown in FIG. 6 also functions to intermittently advance the magnetic tape by a predetermined length with a simple mechanism.

It should be understood that, it is not always necessary to reciprocate the deflector 7 in the direction at right angles with respect to the direction of advance of the tape so that the deflector may be operated in a direction of degrees of 45.

Following embodiments relates to the application of the magnetic tape recording apparatus operating with the principle described above to the incremental magnetic tape recording apparatus having the feature of "read-after-write."

Figure 7:
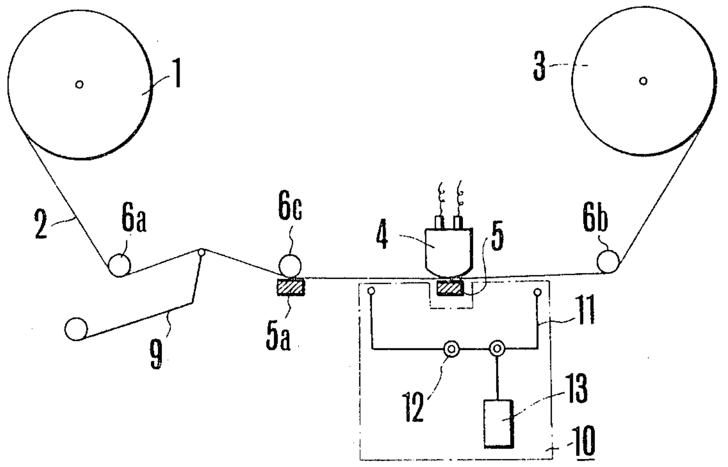
FIG. 7 is a diagrammatic representation of an incremental digital magnetic tape recording apparatus incorporated with the "read-after-write" feature.

In one example shown in FIG. 7, a second braking device 5*a* is provided between the tension arm 9 and the magnetic head 4 to cooperate with a guide roller 6*c*. A push rod 11 of a deflector 10 is pivotally mounted on a pin 12 and is operated by driving means 13 such as a solenoid. The push rod 11 is bifurcated.

The recording apparatus shown in FIG. 7 operates as follows:

FIG. 7 shows the normal condition of the recording apparatus in which the magnetic tape 2 is deflected upwardly by the tension arm 9 between guide rollers 6*a* and 6*c* whereas the tape is maintained straightly between guide rollers 6*c* and 6*b*.

Figure 8:
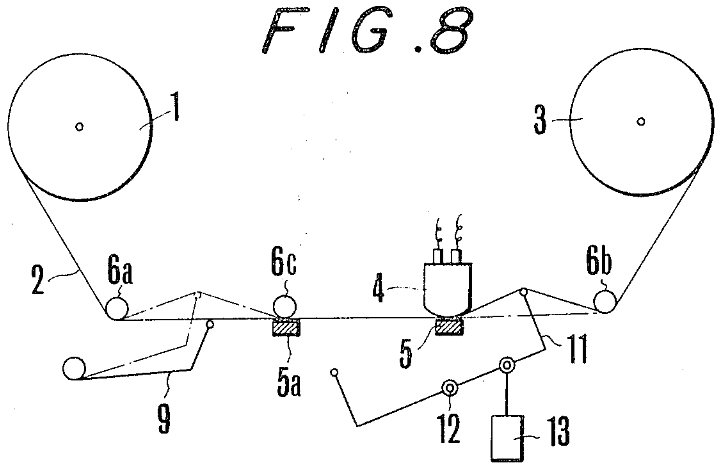
FIGS. 8, 9 and 10 show different steps of operation of the embodiment shown in FIG. 7.

Upon receiving an operating signal the driving means 13 of the deflector 10 is energized to rotate the push rod 11 in the counterclockwise direction to the position shown in FIG. 8. As shown in FIG. 8, the portion of the tape between the magnetic head 4 and the right hand guide roller 6*b* is deflected upwardly by the right hand arm of the push rod 11. The deflected portion of the tape between the magnetic head 4 and the guide roller 6*b* is supplemented by the portion of the tape deflected upwardly by the tension arm 9 and extending between the guide rollers 6*a* and 6*c*. More particularly, as shown in FIG. 8, the tape 2 and the tension arm 9 are caused to move to the solid line positions from the dotted line positions so that a portion of the tape having a length of δL is moved from left to right passed the magnetic head 4.

Figure 9:
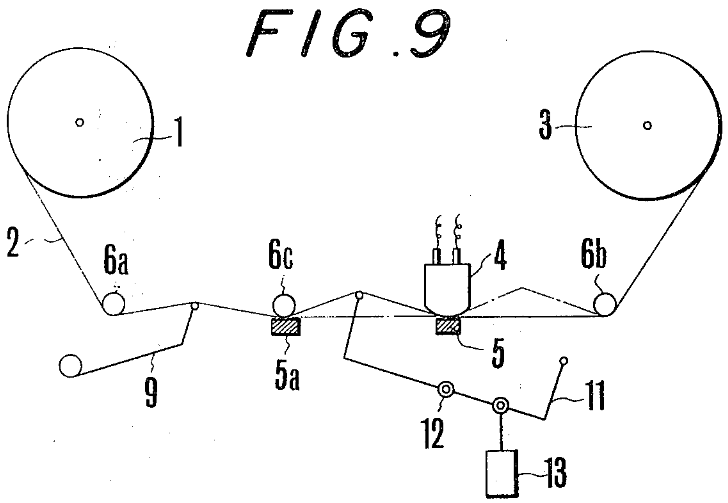

During this movement of the tape, an input signal is recorded therein. To read the content of the signal written in this manner, the push rod 11 of the tape deflector 10 is rotated in the clockwise direction as shown in FIG. 9 after application of braking means 5*a*. Then the tape is deflected from the dotted line position to the solid line position shown in FIG. 9 and the slackened portion of the tape extending between the magnetic head 4 and the guide roller 6*b* is fed back between the magnetic head 4 and the guide roller 6*c*. In other words, the tape is moved back past the magnetic head 4.

It is possible to make the length of the tape moved back as described above to be substantially equal to the length of the forward feed by suitably selecting the angle of rotation of the push rod 11 of the tape deflector 10. During the backward movement of the tape the content of the signal previously recorded in the tape can be read out in the reverse direction.

Figure 10:
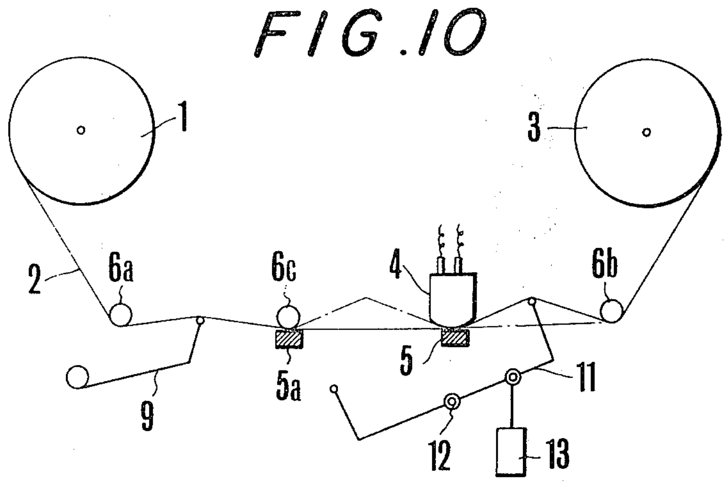

After reading the content, the tape 2 is advanced by rotating the push rod 11 of the deflector 10 again in the counterclockwise direction. FIG. 10 shows the condition of the recording apparatus after the tape was advanced again. As shown in FIG. 10, the tape has shifted from the dotted line position to the solid line position, thus moving the tape from left to right past the magnetic head 4 and allowing the contents of the signal previously recorded on the tape to be read out in the forward direction.

Thereafter, the push rod 11 is rotated in the clockwise direction until both arms of the push rod 11 disengage from the tape. Then, brake 5*a* is released, brake 5 is applied and the slackened portion of the tape extending between the magnetic head 4 and the guide roller 6*b* is taken up by the take up reel 3. Meanwhile the tension arm 9 operates to pull out a new length of the tape from the supply reel 1 and the recording apparatus restores its original or normal condition shown in FIG. 7.

When the content of the signal written into the tape is different from that read out, the signal written in the tape 2 under the condition shown in FIG. 10 can be erased by passing direct current through the magnetic head. Thus, it is possible to positively prevent recording of any erroneous in formation.

Figure 11:
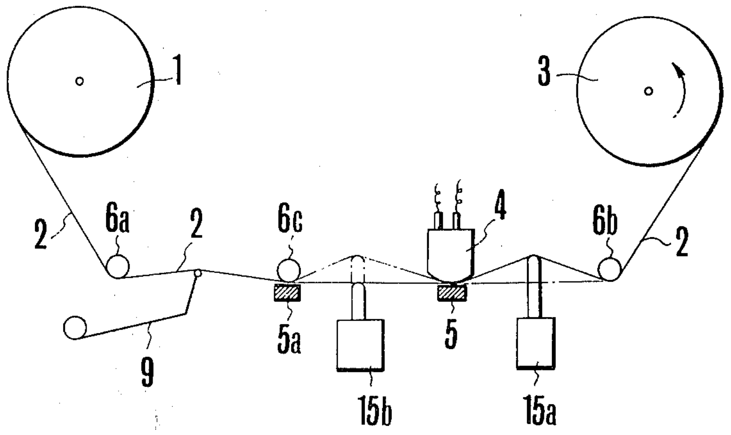
FIG. 11 shows a modification of the embodiment shown in FIG. 7 utilizing two discrete tape deflectors.

The bifurcated push rod 11 may be replaced by two push rods operated by two discrete deflectors 15*a* and 15*b* as shown in FIG. 11 which are identical to the deflector 7 shown in FIG. 1. It will be clear that the embodiment shown in FIG. 11 can operate similarly to that shown in FIGS. 7 to 10 by sequentially operating the deflectors 15*a* and 15*b* with the same timing as the clockwise and counterclockwise rotations of the bifurcated push rod 11.

Figure 12:
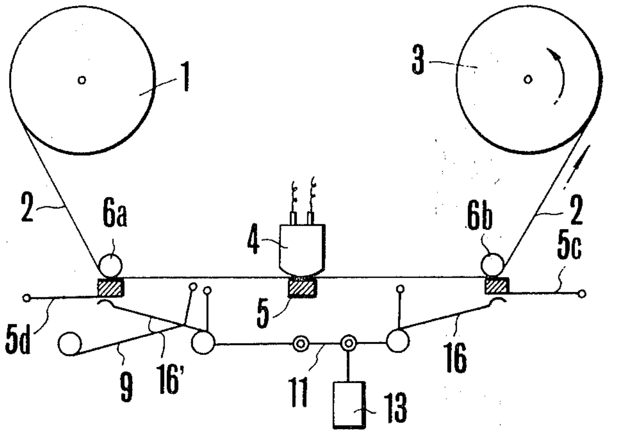
FIG. 12 shows another modification in which the length of the tape fed by the deflector is determined by the stroke thereof and not influenced by the inertia of supply and take up reels.

FIG. 12 shows a still further modification of this invention which is constructed such that the length of the tape moved by the push rod 11 is not effected by the inertias of the supply and take up reels 1 and 3 but determined mainly by the stroke of the push rod 11.

Different from the embodiment shown in FIG. 7, the modified embodiment shown in FIG. 12 is provided with braking devices 5*c* and 5*d* constructed to be operated in connection with the push rod 11. Furthermore, the tension arm 9 is positioned between the magnetic head 4 and the left hand guide roller 6*a*. Leaf springs 16 and 16' are secured to the opposite ends of the bifurcated push rod 11 to cooperate with braking devices 5*c* and 5*d*, respectively.

Figure 13:
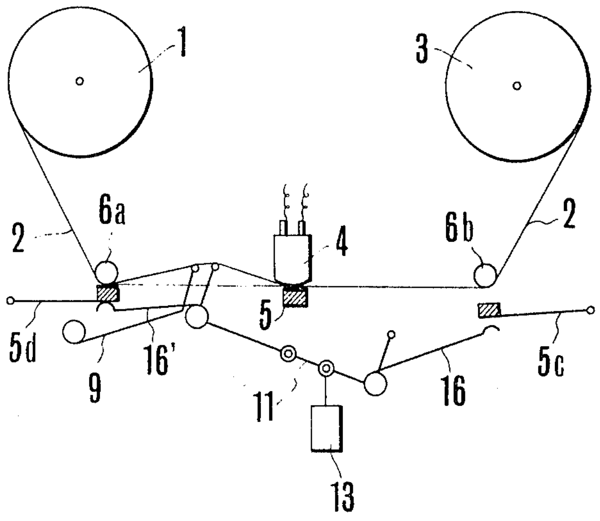
FIGS. 13 through 18 show successive steps of operation of the embodiment shown in FIG. 12.

The operation of the embodiment shown in FIG. 12 will be described hereunder with reference to FIGS. 13 through 18 showing successive steps of operation. More particularly, FIG. 13 shows the normal or waiting condition. Before this condition, the push rod 11 was rotated in the clockwise direction so that in the waiting condition the push rod 11 deflects upwardly the portion of the tape extending between the magnetic head 4 and the left hand guide roller 6*a*. The tension arm 9 engages the tape at substantially the same point at the left hand arm of the push rod 11 to assist the same. Braking device 5*c* is disengaged from guide roller 6*b*, whereas the braking device 5d is urged against guide roller 6*a* by the leaf spring 16' carried by the push rod 11, thus applying a braking force to the magnetic tape 2.

Figure 14:
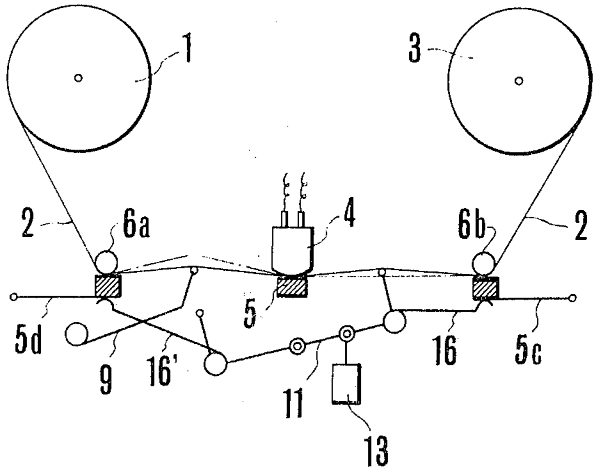

To change the condition from the waiting condition to writing condition, driving means 13 is energized to begin to rotate the push rod 11 in the counterclockwise direction, thereby beginning to deflect upwardly the tape between the magnetic head 4 and the guide roller 6*b* by the right hand arm of the push rod 11, as shown in FIG. 14.

In FIG. 14, the tape 2 has been moved from the dotted line position to the solid line position and in this condition both braking devices 5*c* and 5*d* are urged against guide rollers 6*b* and 6*a*, respectively, by leaf springs 16 and 16' thereby applying braking forces to the tape. Consequently, the tape is deflected upwardly between the magnetic head 4 and the guide roller 6*b* by the right hand arm of the push rod 11. Since the braking device 5*c* is in its operated condition, the difference in the tape length before and after deflection can not be supplied from the side of the take up reel 3 but is supplemented by the slackened portion of the tape extending between the magnetic head 4 and the guide roller 6*a*.

Figure 15:
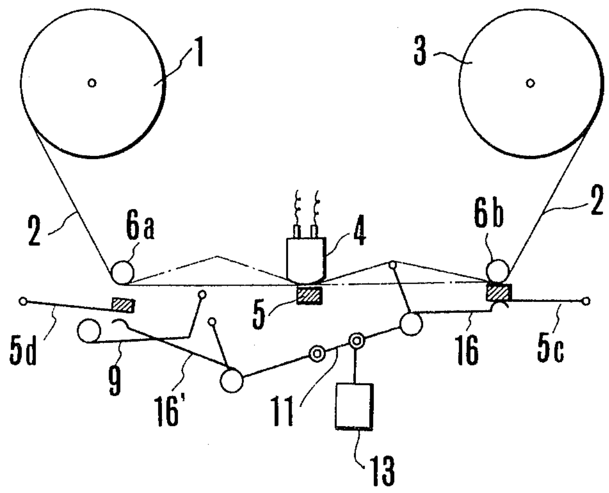

FIG. 15 shows the condition at the end of the counterclockwise rotation of the push rod 11, that is at the end of the write operation of the signal. In the position shown in FIG. 15, the tape 2 has been deflected from the dotted line position to the solid line position thereby feeding the tape a predetermined length passed the magnetic head 4 from left to right. The signal is written in the tape during this feeding.

In the condition shown in FIG. 15, the braking device 5*d* is disengaged from the guide roller 6*b* thereby permitting tape 2 to move freely. However, the braking device 5*c* is still maintained in its operative condition.

Figure 16:
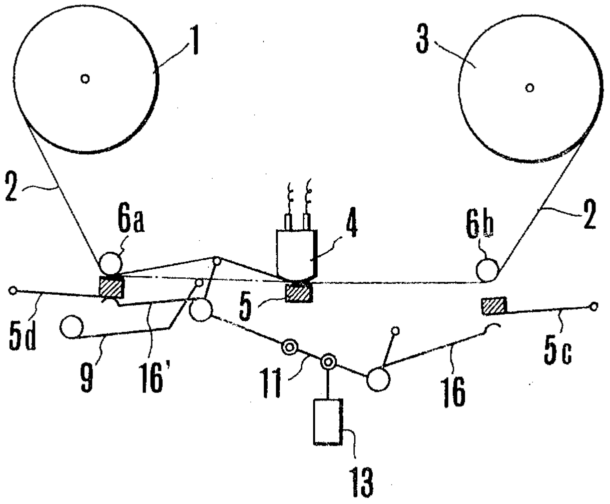

When the push rod 11 of the deflector is rotated in the opposite direction or in the clockwise direction from the position shown in FIG. 15, the braking device 5*d* is urged against the guide roller 6*a* by the force of the leaf spring 16' so that the increment of the length of the tape caused by the upward deflection is supplemented from the take up reel 3 but not from the supply reel 1. This condition is shown in FIG. 16. During the movement of the tape from right to left, the signal is read out in the reverse direction to determined whether the content thereof coincides or not with the content of the signal that has been recorded previously.

As above described, when the tape is moved from left to right, the tape is prevented from being paid back from the take up reel by the action of the braking device 5*c*, whereas when the tape is moved from right to left, the tape is prevented from being supplied from the supply reel 1 by the action of the braking device 5*d*. Under these conditions, the tape is permitted to move toward left or right only between guide rollers 6*a* and 6*b*, the length of the portion of the tape free to move being determined solely by the stroke of the push rod, thereby assuring stable tape feeding operation without the influence of the inertia of the reels.

Figure 17:
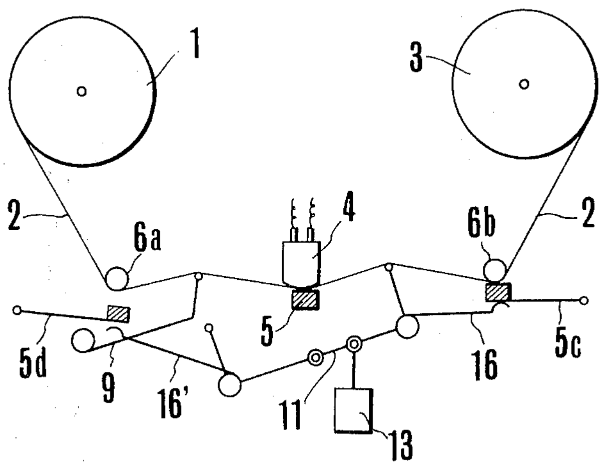

In this manner, after performing the read-after-write operation, the push rod is again rotated in the counterclockwise direction from the position shown in FIG. 16 to the position shown in FIG. 15 whereby the tape 2 is moved from left to right allowing read-out in the forward direction of the previously recorded content. When the push rod 11 is maintained in the position shown in FIG. 15, as the braking device 5*d* is released, the tape will be paid out from reel 1 so that after a predetermined time the recording apparatus will assume the condition as shown in FIG. 17. As can be noted from the foregoing description the response of the tension arm should be slower than that of the push rod 11.

Figure 18:
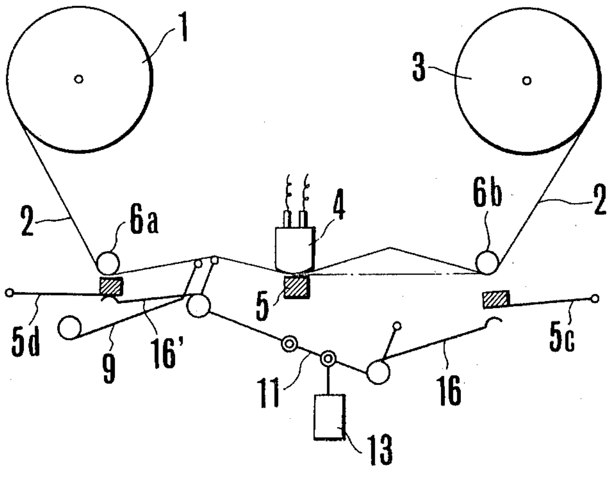

When the push rod 11 is rotated in the clockwise direction from the position shown in FIG. 17, the portion of the tape extending between the magnetic head 4 and the left hand guide roller 6*a* will not be deflected by the clockwise rotation of the push rod 11 because this portion has already been deflected upwardly by the action of the tension arm 9 to the position shown by solid lines in FIG. 18. The slackened portion of the tape extending between the magnetic head 4 and the guide roller 6*b* is taken up by the take up reel 3 because the braking device 5*c* has been released, whereby the recording apparatus restores the waiting condition shown in FIG. 13.

Foregoing description relates to one cycle of the read-after-write operation of the incremental magnetic tape recording apparatus.

As can be clearly noted from the foregoing description the embodiment shown in FIG. 12 is different from that shown in FIG. 7 only in that the former is provided with braking devices 5*c* and 5*d* which are operated in accordance with the operation of the tape deflector. The purpose of these braking devices is to assure a definite length of the tape to be moved during respective steps of the read-after-write operation. It will be clear that a single tape deflector shown in FIG. 12 may be replaced by two discrete deflectors shown in FIG. 11.

According to the modified embodiments shown in FIGS. 7 through 18 it is possible to impart the read-after-write feature into the incremental magnetic tape recording apparatus shown in FIG. 1 by merely providing tape deflectors on both sides of the magnetic head.

In the foregoing description although the invention has been described in terms of some preferred embodiments thereof it will be clear that many changes and modifications will be obvious to one skilled in the art without departing from the true spirit and scope of the invention as defined in the appended claims.

What is claimed is:

1. In an incremental digital magnetic tape recording apparatus in which a magnetic tape is advanced intermittently passing through a magnetic write/read recording head between a pair of tape supply and take up means for recording intermittent input signals, the improvement which comprises braking means for applying a braking force upon said magnetic tape, means for applying a torque upon said take up means to take up said magnetic tape under a predetermined tension smaller than said braking force, and deflector means for deflecting said magnetic tape away from the direction of its normal travel between said magnetic head and said take up and supply means, said deflector means being provided on each side of said magnetic head for incrementally advancing said tape in the take-up direction for writing and alternately incrementally stepping the tape in the reverse direction toward the tape supply means for read after write checking.

2. The magnetic tape recording apparatus according to claim 1 wherein said braking means is positioned between said magnetic head and said supply means.

3. The magnetic tape recording apparatus according to claim 1 wherein said braking means is positioned to cooperate with said magnetic head and further includes additional braking means positioned between said magnetic head and said supply means.

4. The magnetic tape recording apparatus according to claim 3 wherein a pair of guide rollers are provided on the opposite sides of said magnetic head, one of said deflector means is positioned between said magnetic head and one of said guide rollers which is provided on the side of said tape take up means, the other of said deflector means is positioned between said magnetic head and the other of said guide rollers, and a tension arm normally biased toward said magnetic tape is provided between said magnetic head and the other guide roller which is provided on the side of said tape supply means.

5. The magnetic tape recording apparatus according to claim 4 wherein the inertia of the supply and take-up means, the braking force of the braking means, and the operating force of the deflector means are all suitably selected to move the tape a definite length δL past the magnetic head upon each stroke of the deflector means.

6. The magnetic tape recording apparatus according to claim 5 wherein said deflector means comprise a pair of discrete deflectors positioned on the opposite side of said magnetic head.

7. The magnetic tape recording apparatus according to claim 5 wherein said deflector means comprises driving means, and a push rod operated by said driving means and pivotally supported at its intermediate point, said push rod having spaced apart arms adapted to engage said magnetic tape on the opposite sides of said magnetic head.

8. The magnetic tape recording apparatus according to claim 5 wherein a pair of guide rollers are provided adjacent said tape supply means and said tape take up means respectively, a first braking device is associated with said magnetic head, a second braking device is positioned between said magnetic head and one guide roller positioned on the side of said supply means, a tension arm normally biased to engage said tape is provided between said second braking device and said one guide roller and said deflector means is positioned to engage said tape between said magnetic head and said second braking device and between said magnetic head and the other guide roller.

9. The magnetic tape recording apparatus according to claim 7 wherein a pair of guide rollers are disposed between said magnetic head and said tape supply and take up means, a first braking device is associated with said magnetic head, second and third braking devices are associated with said pair of guide rollers, respectively, said arms of said push rod are arranged to engage portions of said magnetic tape extending respectively between said magnetic head and one guide roller positioned on the side of said supply means and between said magnetic head and the other guide roller positioned on the side of said take up means, and said push rod is provided at its opposite ends with a pair of leaf springs for cooperating with said second and third braking devices, respectively.

10. The magnetic tape recording apparatus according to claim 9 wherein a tension arm normally biased toward said magnetic tape is provided, said tension arm engaging said magnetic tape at substantially the same point as one of said arms of said push rod between said magnetic head and said one guide roller positioned on the side of said supply means.

11. The magnetic tape recording apparatus according to claim 1 wherein said deflector means is operated by a solenoid coil.

12. The magnetic tape recording apparatus according to claim 1 wherein said deflector means is operated by a moving coil type actuator.

13. The magnetic tape recording apparatus according to claim 1 wherein said deflector means is operated by a pneumatic actuator.

* * * * *